(12) United States Patent
Lieb et al.

(10) Patent No.: US 9,733,886 B2
(45) Date of Patent: Aug. 15, 2017

(54) METHOD AND SYSTEM FOR BROWSER-BASED SCREEN SHARING

(75) Inventors: Adam Michael Lieb, San Francisco, CA (US); James L. Benton, San Francisco, CA (US)

(73) Assignee: Clearslide, Inc., San Francisco, CA (US)

( * ) Notice: Subject to any disclaimer, the term of this patent is extended or adjusted under 35 U.S.C. 154(b) by 124 days.

(21) Appl. No.: 12/953,054

(22) Filed: Nov. 23, 2010

(65) Prior Publication Data

US 2011/0126130 A1  May 26, 2011

Related U.S. Application Data

(60) Provisional application No. 61/264,185, filed on Nov. 24, 2009.

(51) Int. Cl.
| | | |
|---|---|---|
| G06F 13/00 | (2006.01) |
| G06F 3/048 | (2013.01) |
| G06F 17/30 | (2006.01) |
| G06F 15/16 | (2006.01) |
| G06F 3/14 | (2006.01) |

(52) U.S. Cl.
CPC ....... *G06F 3/1454* (2013.01); *G09G 2370/02* (2013.01)

(58) Field of Classification Search
CPC .. G06Q 10/10; G06F 17/30873; G06F 3/0481
USPC .......................... 715/753, 751; 709/204, 205
See application file for complete search history.

(56) References Cited

U.S. PATENT DOCUMENTS

| | | | |
|---|---|---|---|
| 5,654,726 A * | 8/1997 | Mima et al. ................. 345/2.2 |
| 6,295,551 B1 | 9/2001 | Roberts et al. |
| 7,127,745 B1 | 10/2006 | Herse et al. |
| 7,533,146 B1 | 5/2009 | Kumar |
| 9,471,694 B2 | 10/2016 | Lieb et al. |
| 2002/0013833 A1 | 1/2002 | Wyatt et al. |
| 2002/0016861 A1* | 2/2002 | Simonoff ..................... 709/250 |
| 2002/0038346 A1 | 3/2002 | Morrison et al. |
| 2002/0073155 A1 | 6/2002 | Anupam et al. |
| 2002/0194611 A1* | 12/2002 | Hodgkinson ................ 725/109 |
| 2003/0182375 A1* | 9/2003 | Zhu et al. .................... 709/205 |
| 2003/0212744 A1* | 11/2003 | Dunlap et al. .............. 709/204 |
| 2004/0080504 A1* | 4/2004 | Salesky et al. .............. 345/418 |

(Continued)

FOREIGN PATENT DOCUMENTS

WO  2009140766 A1  2/2009

OTHER PUBLICATIONS

Berena, A.J., et al., Shared Virtual Presentation Board for e-Communication on the WebELS Platform, Proceedings of the 18th International Conference on Computers in Education (ICCE 2010), pp. 280-284, 2010.

(Continued)

*Primary Examiner* — Jordany Nunez
(74) *Attorney, Agent, or Firm* — Perkins Coie LLP

(57) ABSTRACT

A method for remote screen sharing using only web-browsers is described. The presenter opens a web page containing an applet that sends the screen data to the server. The presenter may share their entire screen, or may only share a specially marked active display area. The server stores the data and makes it available viewers. Viewers are able to view the presenters screen directly in the web browser, without any downloads, plug-ins, or dialog boxes.

20 Claims, 6 Drawing Sheets

(56) References Cited

U.S. PATENT DOCUMENTS

| | | | |
|---|---|---|---|
| 2004/0083236 A1* | 4/2004 | Rust | 707/104.1 |
| 2004/0139156 A1* | 7/2004 | Matthews | G06Q 30/01 |
| | | | 709/204 |
| 2004/0181579 A1* | 9/2004 | Huck et al. | 709/205 |
| 2004/0230825 A1 | 11/2004 | Shepherd et al. | |
| 2005/0132299 A1* | 6/2005 | Jones et al. | 715/759 |
| 2006/0075359 A1* | 4/2006 | Bauchot et al. | 715/790 |
| 2006/0218285 A1 | 9/2006 | Talwar et al. | |
| 2007/0208992 A1 | 9/2007 | Koren | |
| 2007/0245248 A1* | 10/2007 | Christiansen | 715/753 |
| 2007/0266325 A1 | 11/2007 | Helm et al. | |
| 2007/0294626 A1 | 12/2007 | Fletcher et al. | |
| 2008/0016155 A1* | 1/2008 | Khalatian | 709/204 |
| 2008/0059583 A1* | 3/2008 | Mao et al. | 709/205 |
| 2008/0162635 A1 | 7/2008 | Keren et al. | |
| 2008/0267178 A1 | 10/2008 | Emmerich et al. | |
| 2009/0055822 A1 | 2/2009 | Tolman et al. | |
| 2009/0292999 A1 | 11/2009 | LaBine et al. | |
| 2010/0257449 A1 | 10/2010 | Lieb et al. | |
| 2011/0083076 A1 | 4/2011 | Kang et al. | |
| 2011/0093773 A1 | 4/2011 | Yee | |
| 2011/0173256 A1 | 7/2011 | Khalatian et al. | |
| 2011/0276619 A1 | 11/2011 | Khan et al. | |
| 2011/0276900 A1 | 11/2011 | Khan et al. | |
| 2012/0030579 A1 | 2/2012 | Morard et al. | |
| 2012/0191784 A1 | 7/2012 | Lee et al. | |
| 2012/0317487 A1 | 12/2012 | Lieb et al. | |
| 2014/0032735 A1 | 1/2014 | Kapoor | |
| 2014/0126708 A1 | 5/2014 | Sayko et al. | |
| 2015/0039998 A1 | 2/2015 | Lieb et al. | |

OTHER PUBLICATIONS

Co-pending U.S. Appl. No. 13/484,253, filed May 30, 2012.
International Application No. PCT/US2012/040054, International Search Report, 3 pages, Jan. 31, 2013.
International Application No. PCT/US2011/040054, Written Opinion, 4 pages, Jan. 31, 2013.
Final Office Action mailed Jan. 15, 2015, in U.S. Appl. No. 13/484,253 of Lieb et al., filed May 30, 2012.
International Search Report and Written Opinion mailed Oct. 18, 2013, for International Application No. PCT/US2013/048327, 8 pages.
Non-Final Office Action mailed Aug. 14, 2014, U.S. Appl. No. 13/484,253, filed May 30, 2012.
Notice of Allowance mailed Apr. 13, 2015, in U.S. Appl. No. 13/484,253 of Lieb et al., filed May 30, 2012.
Richardson, T., et al., "Virtual Network Computing," IEEE Internet Computing vol. 2 No. 1 in Jan./Feb. 1998.
U.S. Appl. No. 13/841,237, filed Mar. 15, 2013, Lieb et al.
International Search Report and Written Opinion mailed Nov. 10, 2014, for International Application No. PCT/2014/049180, 7 pages.
Non-Final Office Action mailed Sep. 4, 2015, for U.S. Appl. No. 13/841,237 of Lieb et al. filed Mar. 15, 2013.
U.S. Appl. No. 14/448,620 of Lieb, A.M. et al. filed Jul. 31, 2014.
Extended European Search Report mailed Feb. 25, 2016, for European Patent Application Number/Pat. No. 12793430.5-1957/2715556, 7 pages.
Final Office Action mailed Feb. 11, 2016, U.S. Appl. No. 13/841,237 of Lieb et al. filed Mar. 15, 2013.
Notice of Allowance mailed Jul. 16, 2015, in U.S. Appl. No. 13/484,253 of Lieb et al., filed May 30, 2012.
Non-Final Office Action mailed Apr. 12, 2016, U.S. Appl. No. 14/448,620 of Lieb, A.M. et al. filed Jul. 31, 2014.
Advisory Action dated Oct. 11, 2016 in U.S. Appl. No. 14/448,620 of Lieb A. et al. filed Jul. 31, 2014.
Dutton, Sam; "Screensharing with WebRTC"; Dec. 2012; Google Developers; retrived fromm https://developers.google.com/web/updates/2012/12/Screensharing-with-WebRTC.
Non-Final Office Action dated Dec. 12, 2016, U.S. Appl. No. 14/448,620 of Lieb, A.M. et al. filed Jul. 31, 2014.
Non-Final Office Action dated Oct. 5, 2016 in U.S. Appl. No. 13/841,237 of Lieb A. et al. filed Mar. 15, 2013.
Notice of Allowance dated Jun. 6, 2016, in U.S. Appl. No. 13/484,253 of Lieb et al., filed May 30, 2012.
Final Office Action dated Jun. 27, 2016 in U.S. Appl. No. 14/448,620 of Lieb, A. et al. filed Jul. 31, 2014.
Advisory Action dated Jun. 7, 2016 in U.S. Appl. No. 13/841,237 of Lieb, A. et al. filed Mar. 15, 2013.
Accomplish Screen Sharing Using WebRTC, Stack Overflow; stackoverflow.com/questions/17542384/accomplish-screen-sharing-using-webrtc, 3 pages.
"Screen Sharing with WebRTC", Stack Overflow; stackoverflow.com/questions/13616449/screen-sharing-with-webrtc, 3 pages.
International Search Report and Written Opinion dated Nov. 20, 2014, for International Application No. PCT/US2014/049180, 8 pages.
Final Office Action dated Mar. 1, 2017, in U.S. Appl. No. 14/448,620 of Lieb, A. et al. filed Jul. 31, 2014.

* cited by examiner

METHOD AND SYSTEM FOR BROWSER-BASED SCREEN SHARING

CROSS-REFERENCE TO RELATED APPLICATIONS

This application claims the benefit of U.S. Provisional Application No. 61/264,185 entitled "METHOD FOR BROWSER-BASED SCREEN SHARING", filed Nov. 24, 2009, and is hereby incorporated by reference in its entirety.

BACKGROUND OF INVENTION

Field of Invention

The present teaching provides a variety of methods, systems and architectures for remote computer screen sharing. In one presentation sharing embodiment, images of a presenter's computer screen are captured and transmitted for display over a communications network, such as the Internet, to one or more viewers, where both the presenter and viewer(s) use web-browsers to access and view the content.

Description of Related Art

Often it is useful for a presenter to broadcast the contents of their computer screen over a network to remote viewers, such as to demonstrate the capabilities of a software product or website. Several commercial solutions, such as WebEx™ and GoToMyPC™, offer screen sharing related products. Although useful, in these sharing products the presenters must download and install software (such as executables or plug-ins) to the presentation computer, while the viewer must complete a time-consuming setup process, which can include software downloads and email-based invitation setup process, to connect the viewer to the presenter. These limitations prevent the usage in certain situations, such as a sales call and limit the devices upon which it can run. Additionally screen sharing solutions often require significant bandwidth to send a full video of the presenters screen and can often result in slow updates or momentary screen freezes for the viewers, and can not work at all over slower network connections. Further, screen sharing is not ideal for showing video or animations (due to a much slower update rate), quickly showing image slides, or allowing remote users to interact directly with webpages. As such, presenters often need a solution that allows them to quickly switch between display modes, where screen sharing is only one of several types of supported modes. Thus, solutions which only offer screen sharing are not sufficient for all a customers needs.

SUMMARY OF THE INVENTION

The present invention contemplates a variety of methods and systems for screen sharing using only web browsers for both the presenter and the viewers. The presenter starts by providing the viewers with a short web URL which uniquely identifies the presenter. When the viewers type that URL into a web browser, they see the slide which is currently selected by the presenter. The presenter can then walk through the slides in the presentation. The slides can contain any content, including images or webpages, and are particularly useful for provide a live demo through slides. Once a presenter reaches the live demo slide, the presenter views a web page which contains an embedded Java applet, the presentation applet. Once the presenter approves the browser's security request, the presentation applet immediately begins running and sharing the presenter's screen. The viewer(s) then automatically see a reproduction of the presenter's monitor in their web-browsers. The viewers did not have to download any software or plug-ins or agree to any dialog boxes. As the presenter moves their pointer (e.g., mouse), or opens windows, types in text, etc. these changes are reflected on all the viewer's browsers. Then, when the presenter is ready to continue presentation, they use the navigation bar and continue to another slide, or to close the presentation.

The system can keep track of detailed statistics, including how long the screen sharing was running, who was viewing, as well as a series of images of what was displayed during the session.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

Figure 1:
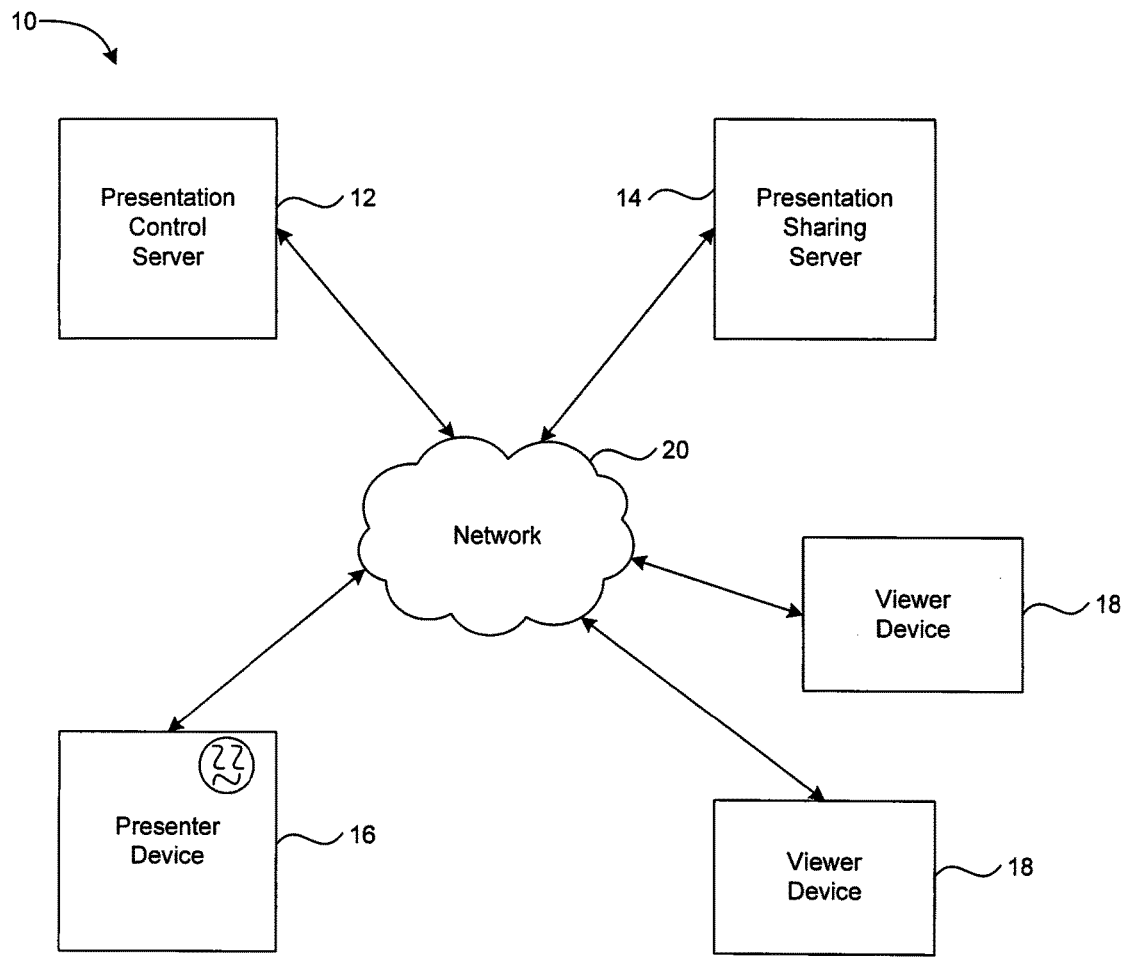
FIG. 1 shows a block diagram of a browser-based screen sharing system.

FIG. 1 illustrates a system 10 for screen sharing according to one embodiment. The system 10 includes a presentation control server 12 (optional), a presentation sharing server 14, a presentation device 16, and one or more viewer devices 18, all coupled bi-directionally via a network 20. Those skilled in the art will be familiar with the computer systems suitable for use in implanting servers and user devices. For example, the presentation device 16 or the viewer devices 18 can each be any suitable computing device such as a personal computer, netbook, portable computing device, etc.

The presentation control server 12 sets up an environment for the screen sharing, and is described in more detail in Lieb's U.S. patent application Ser. No. 12/756,110, filed Apr. 7, 2010, entitled MIXED CONTENT TYPE PRESENTATION SYSTEM, and incorporated herein by reference. The presentation control server 12 can give a presenter the tools to navigate through the slides of the presentation, and then, when the presenter reaches a screen sharing slide, display the appropriate web pages to the presenter and viewers. The presentation control server 12 can also act as a load balancer. In this case, the presentation control server can consider the geographic and/or network locations of the presenters, viewers, and sharing servers and the current load of each sharing server, and then pick the best sharing server to use which minimizes transmission distance while also distributing load.

As will be appreciated, the presentation control server 12 is an optional component. Screen sharing can be implemented without a separate control server, e.g., if screen sharing is not operating in the context of a larger presentation. That is, the presentation control server 12 can be useful for setting up the context in which the screen sharing operates but is not necessary. Alternatively, the functionality of the presentation control server 12 can be implemented on the presenter sharing server 14, the presenter device 16, or distributed across several different systems.

Also, note that the presentation device can be switched among multiple users during the course of a presentation. That is, the presentation control can be passed among multiple people, some of which may have previously been acting as viewers.

Figure 2:
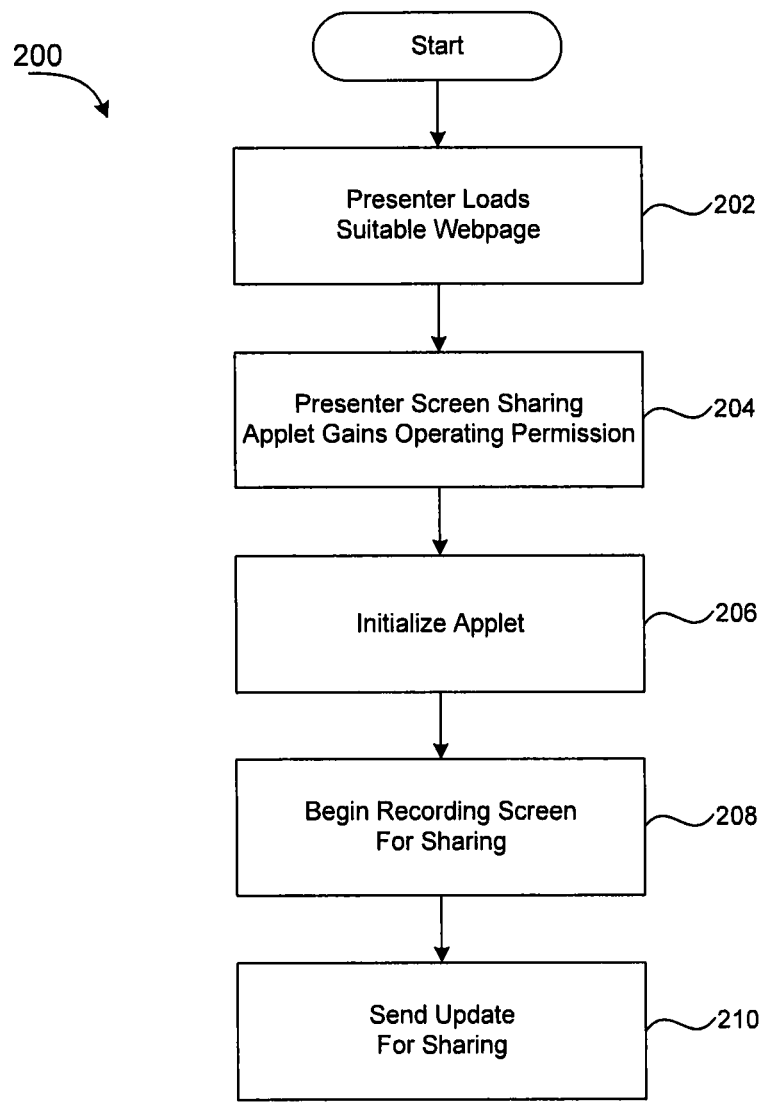
FIG. 2 is a flow chart for generating and transmitting presentation images.
Figure 3:
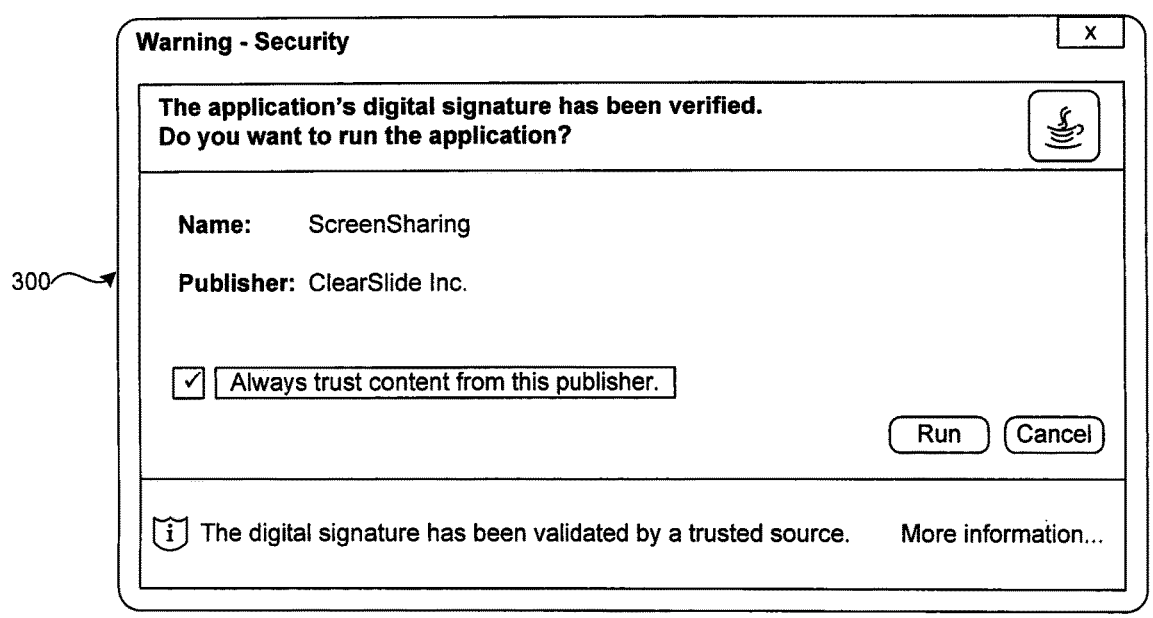
FIG. 3 shows a browser's standard security dialog.

Operation of the presentation device 16 of FIG. 1 will now be described in detail with further reference to FIGS. 2 and 3. FIG. 2 illustrates a method 200 for generating and transmitting presentation images. In step 202, while viewing a desired live demo, the presenter loads a webpage which contains presentation applet 22 into a web browser running on the presentation device 16. As will be appreciated, the presentation applet 22 can be a java applet or other suitable executable code. In step 204, the presentation applet 22 gains operating permission to control the browser. A java applet such as the presentation applet 22 is signed by a code signing certificate, so the browser automatically shows a permission dialog box (such as dialog box 300 of FIG. 3) to the presenter, asking permission to run the applet. This is required because the presentation applet 22 operates by capturing and sending images of the presenter's screen, which is a security violation unless authorized. As will be appreciated, the exact permission window is specific to the web-browser. Some web-browsers include a checkbox that allows this presenter to skip this step on subsequent sessions.

With further reference to FIG. 2, after the permission is given in step 204, step 206 initializes the presentation applet 22. The webpage accessed by the presenter's browser can pass initialization information to the presentation applet 22, including a token which uniquely and securely identifies the presentation, a "key" which controls who can present, and other useful initialization parameters.

In step 208, the presentation applet 22 begins recording the presenter's screen. In some embodiments, the presentation applet 22 provides feedback to the presenter that screen sharing has started. The feedback may include, for example, a red blinking light and/or an error message if screen sharing could not be started due to an error.

In some embodiments, the presentation webpage provides additional options besides displaying the applet, to help launch the screen sharing. For example, the web page can display a thumbnail of a webpage and a button which opens a new browser window containing that webpage, or an index to a set of multiple webpages, to reduce the number of steps the presenter needs to complete during a presentation and to optimize the size and positioning of the web page for the purposes of screen sharing. Also, this web page can be launched within a specially formatted frame that contains specific markings which help identity the display area, as described below. Alternatively, the webpage can include text prompting the presenter to open a specific desktop application or file. Once the screen is recorded in step 208, step 210 sends image information (e.g., initial presentation image or an update) to the viewer device(s) 18.

Figure 4:
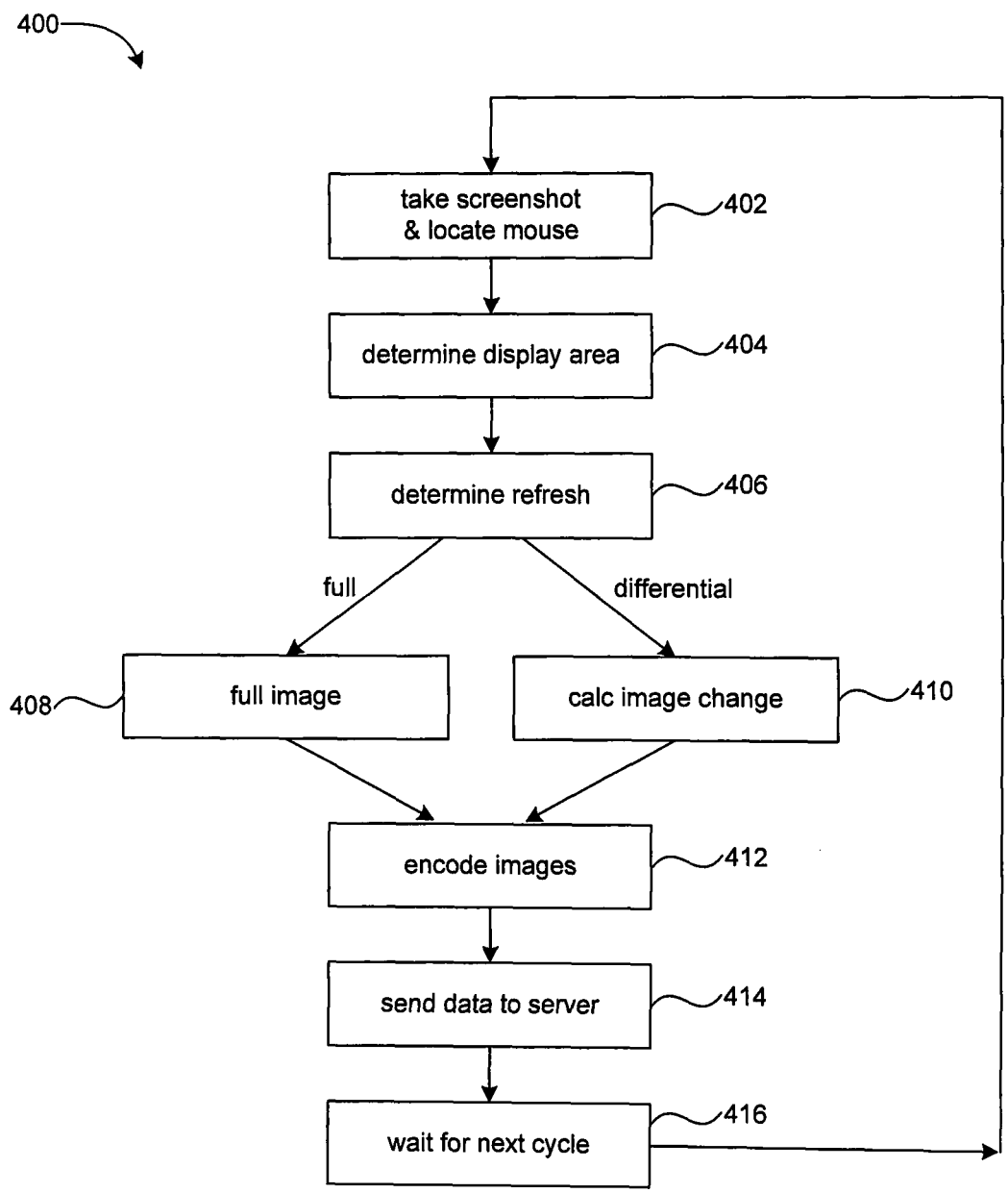
FIG. 4 is a flow chart for capturing and transmitting the screen images.

With reference to FIG. 4, a method 400 corresponding to steps 208 and 210 of FIG. 2 will now be described. In step 402, the presentation applet 22 takes a screenshot at a presenter device and records pointer location. As will be appreciated, the present teaching does not involve continuous screen sharing or presentation video streaming, but rather periodic and/or triggered sharing of captured screen images. In step 402, the "display area" for the presentation is determined. Each time the presentation applet 22 records the screen, the applet must determine the "display area"— i.e. the specific portion of the screen which includes the content the presenter intends to share. Often the presenter would rather show only the active window, rather then the entire screen, because this requires less scrolling on the viewers part—especially if the viewer's window is smaller then the presenter's—and because the presenter may get other popups and instant messages not intended for sharing. However, due to technology constraints, the presentation applet has no inherent capability for determining where the "active window" is. Therefore, some embodiments provide a mechanism for determining the active window. In certain embodiments, this mechanism may be selectively toggled by the presenter.

One suitable mechanism for determining the active window includes placing an identifying image on the webpage. The web pages (whether the introductory applet webpage or the newly launched webpages the presenter is showing) can include small unique markings. These markings can include an image strategically located in the active window. For example, the image can be placed in the corners of the display area and include a unique combination of colors (like an image based password). Alternatively, or in addition, a 1 pixel strip of a specific color can connect the markings and frame the display area. Then, the presentation applet 22 can look for these markings and strips to determine the active window. If the markings can't be found, or the window containing the markings is significantly obscured, the presentation applet 22 can default to identifying the presenter's entire screen as display area, or perhaps allow the presenter to manually define the active window.

With further reference to recording screen presentation images, the presentation applet 22 can record images of the display area at set intervals and/or at other suitable triggering events. Every time the presentation applet 22 records the screen a decision is made what to send to the server at a step 406. The applet can either perform a full refresh step 408 (i.e. send the whole display area (a "full refresh")) or a differential update step 410 (i.e., send just the areas of the display area which have changed ("differential update")). Full refresh takes more time and bandwidth, so differential updates are typically preferable when appropriate.

In some embodiments, the presentation applet 22 sends a full refresh only in specific circumstances such as:

(a) The presentation has just begun and the presentation applet is sending a first image.

(b) The presentation display area has changed.

(c) The presentation sharing server has requested that the presentation applet 22 send a full refresh. This can happen, e.g., when new viewers come online and request a full refresh of the presentation sharing server. This way the servers do not need to maintain a "full, current image."

(d) Most (e.g. above a specific percentage) of the active window or captured image has changed, so the difference between an incremental update and a full update is not so great.

(e) The presentation applet has sent the maximum number of consecutive differential updates. Differential updates have a maximum because certain layering methods the viewer device uses to update the screen can result in memory issues, and full updates generally can clean up minor display inconsistencies if any occur for any reason (e.g. momentary network issues, etc).

In the case of the differential update step 410, the presentation applet 22 compares each pixel of the current display area to the last display area, and determines any changes.

Continuing on with FIG. 4 in step 412, for each image update the presentation applet 22 encodes the images using a standard encoding method, like GIF, PNG, or JPEG. Also, the presentation applet may split the image into multiple smaller images that can be sent separately. This can shorten the time it takes for the viewer to see at least a partial screen update. In step 414, the presentation applet 22 then sends all the data to the server, including the presentation token, key, current mouse position relative to the current display area, and the update images (each including the x, y, width, height, sequence identifier and encoded image data, and a flag indicating a full-refresh vs. a differential update images). The presentation applet 22 can use a standard web encoding method (e.g. HTTP Multi-part POST)—to avoid any firewall issues associated with non-standard ports or transmission methods. The presentation applet 22 then receives a response from the presentation sharing server, which may include a request for a refresh.

The presentation applet 22 then waits for a suitable trigger (e.g., wait period since last capture expired) to repeat the cycle in step 416. If the presentation applet just received a request refresh, it may start the cycle immediately, to minimize the viewer's initial wait time.

Figure 5:
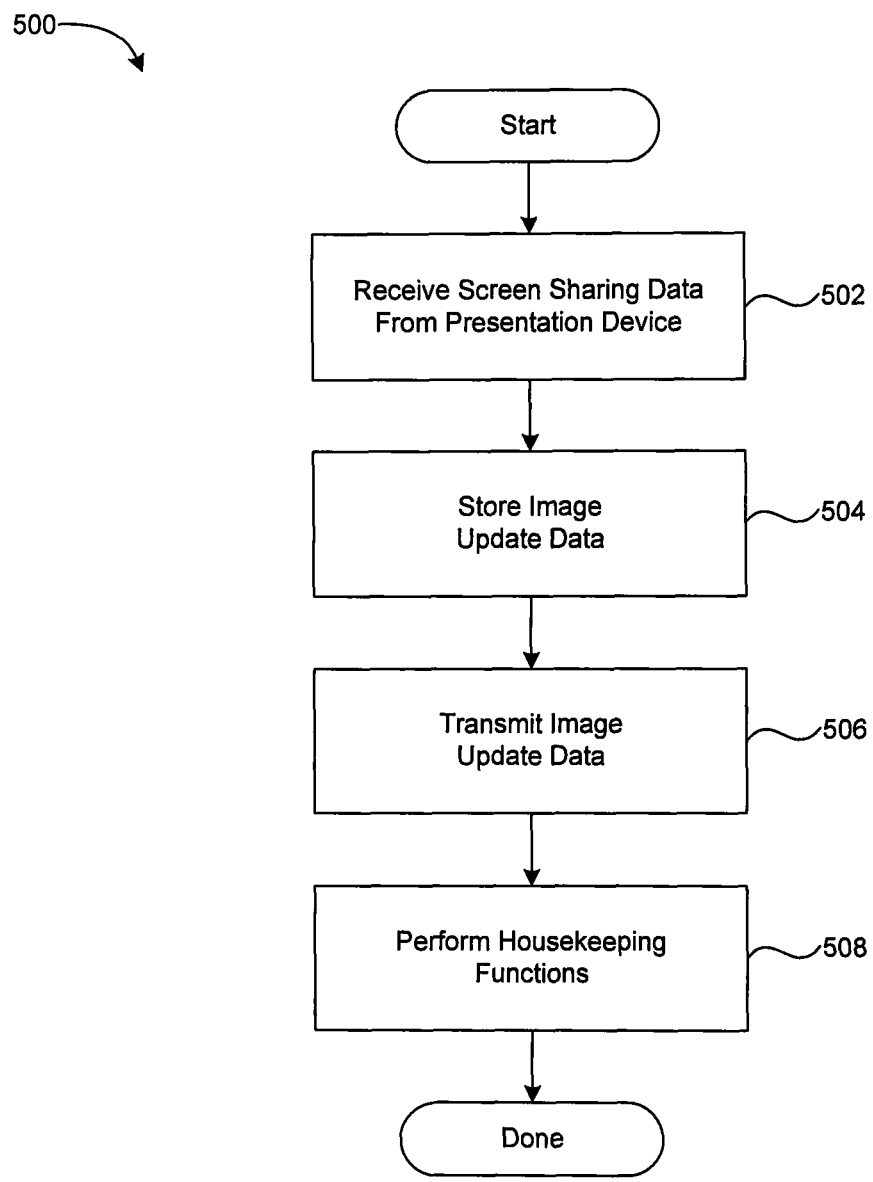
FIG. 5 is a flow chart for operation of a presentation screen sharing server.

FIG. 5 illustrates one suitable method 500 for operation of a screen sharing server. As will be appreciated, a server may be required for screen sharing because viewers generally can not connect directly to a presenter's computer over the Internet, due to firewalls. In any event, in step 502, the screen sharing server receives screen sharing data from a presentation device. In step 504, the screen sharing server stores image update data in memory or other storage. In step 506, the screen sharing server transmits image update data to the viewer(s). This transmit may be in response to a viewer requesting image update data by providing a presentation token and a sequence identifier to the screen sharing server. The screen sharing server then determines which images the viewer needs by comparing the sequence identifiers of the images in memory to the one provided by the viewer. Since the screen sharing server only needs to store a small time window's worth of images, the server can store images directly in transient memory, for performance reasons.

With further reference to FIG. 5, the screen sharing server further performs a variety of housekeeping functions in step 508. For example, the server records refresh requests from the viewers and then pass these back to the presenter's applet. When the applet sends the server back full refresh images, the server can choose to convert some of these to persistant image files which can be stored in persistent memory (like a hard drive) to record what the presenter showed. In the event that the presenter applet has disconnected for some reason (e.g. hasn't sent any updates for a given amount of time) the server can communicate this status to the viewers, so they can display the appropriate "waiting for update" message.

Figure 6:
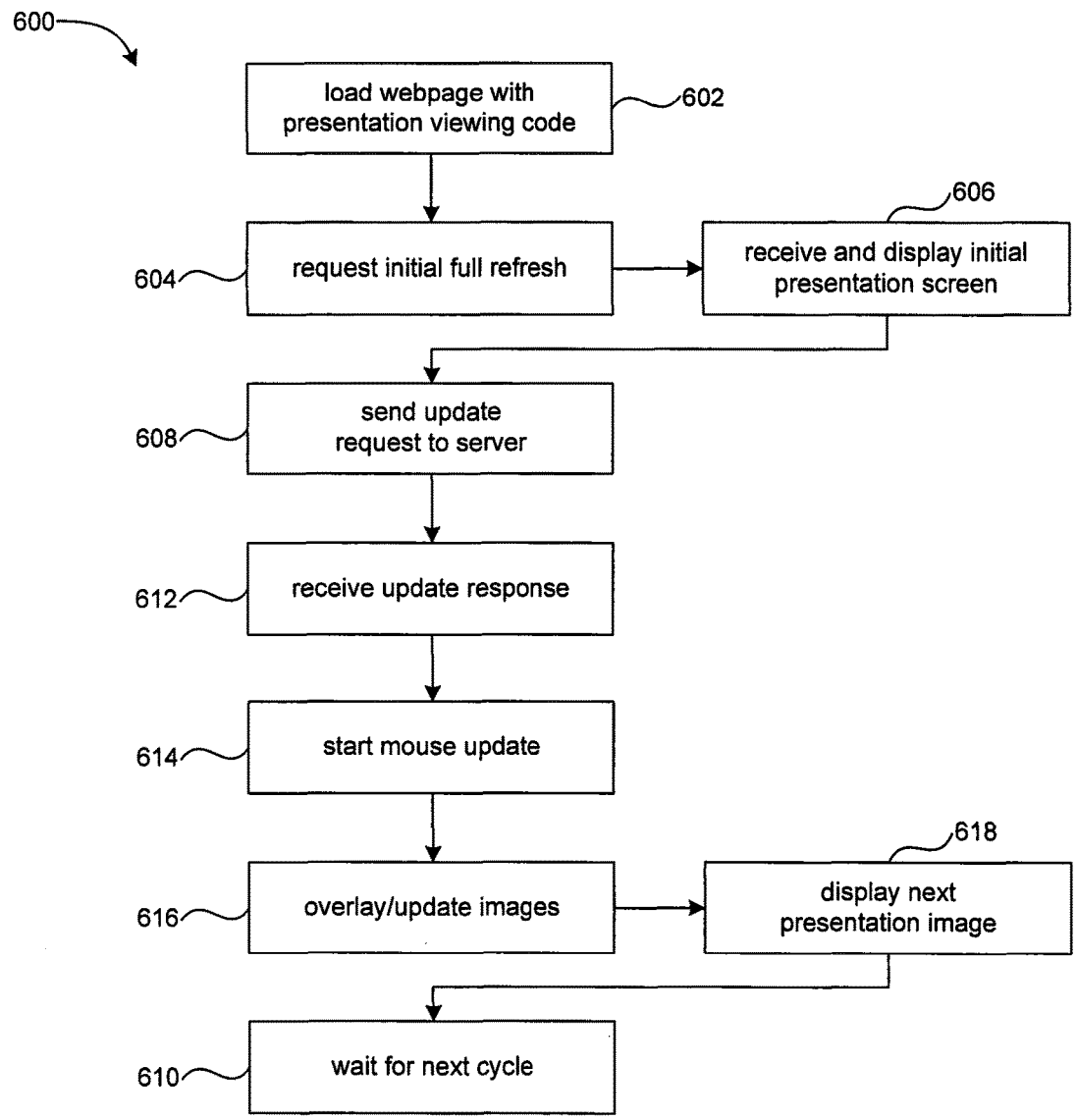
FIG. 6 is a flow chart of the overall logic flow in the viewer's page for receiving and displaying screen images.

FIG. 6 illustrates a method 600 for operation of a viewer device to participate in a presentation by receiving and displaying screen images. In step 602, the viewer loads a webpage which contains presentation viewing code in any suitable form such as JavaScript Ajax code. The webpage may be accessed, e.g., through a short web URL provided to the viewer by the presenter. Because the code is loaded in the webpage, the viewer need not take additional initialization steps such as downloading and installing additional application code or third party plugins on the viewer device, etc. Also, because the code is delivered in javascript, it can run on a wide range of devices, including PCs with all popular operating systems, smartphones with javascript enabled browsers, and tablet-type devices. In step 604, the presentation viewing code requests an initial full refresh presentation image. In step 606, the presentation viewing code receives and displays an initial presentation image on the viewer device. In steps 608 and 610, the JavaScript code makes update requests to the presentation sharing server, waiting the predefined cycle time and/or requesting based on some other suitable trigger event. The presentation sharing server responds with the image update data received in step 612. The image update data typically includes display coordinates, whether the image is a full update or a differential update, any changes to the cycle time, and the current mouse coordinates.

In step 614, the viewer determines the appropriate presentation screen image including mouse or pointer information. E.g., the viewer device generates the screen image including an image that represents the presenter's current mouse cursor and cursor location. The viewer device may receive a full pointer path for the presenter's mouse, which tracks all the presenter's recent mouse/pointer movements, or may just receive the current mouse position, in which case the viewer device code will construct a reasonable path from the presenter's last mouse position to the presenter's current mouse position. The viewer code can then animate a mouse movement by rendering the image of the presenter's mouse along the reconstructed path.

In step 616, the code determines the proper coordinates to display the update images, by layering these images over the existing images. It can accomplish this in dynamic cases by creating dynamic, absolutely positioned divs with ever increasing z-indexes. Whenever the viewer receives a full refresh image, all the underlying images can be cleared out, thus saving on memory. The end result is image display step 618, where the viewer code is able to display the presenter's screen directly in the viewer's browser, without requiring any downloads, plug-ins, or security windows.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

We claim:

1. A computer implemented method for efficient web browser-based remote screen sharing of image data to be selectively captured from a presenter's computer screen and selectively transmitted for display to one or more viewers over a communications network, comprising:
   supporting both synchronous and asynchronous viewing of presentation images converted from presentation slides, wherein both the synchronous and asynchronous session of presentation viewing is supported through a webpage using Javascript on a web browser, wherein the webpage enables a screen sharing session between the presenter and the viewer through a placeholder presentation item among the presentation images;
   receiving from a presenter device, at a presentation sharing server, presentation image data comprising either:
      full refresh data of a display area of a screen image at the presenter device or a differential update of the display area;
   sending, to a viewer device, a presentation viewing webpage, the presentation viewing webpage comprising an embedded viewing script wholly implemented within the presentation viewing webpage, the embedded viewing script configured to send an image refresh request to the presentation sharing server, to receive an image requested, and to display the image requested;

receiving, from the viewer device, an image refresh request at the presentation sharing server, the image refresh request comprising an image sequence identifier derived by the viewer device, wherein the image refresh request is sent upon execution of the viewing script at a web browser running on the viewer device;

in response to the image refresh request received from the viewer device, determining requested presentation image data based on the sequence identifier received from the viewer device;

transmitting the requested presentation image data from the presentation sharing server to the viewer device, responsive to the image refresh request, wherein execution of the viewing script (i) further causes the viewer device to display at least a portion of the transmitted presentation image data at the viewer device and (ii) constructs a path from the presenter's last cursor position to the presenter's current cursor position to animate cursor movement by rendering on the viewer device the image of the presenter's cursor along the reconstructed path.

2. A computer implemented method as recited in claim 1, wherein the viewer device is one of a plurality of viewer devices accessing the presentation via the presentation sharing server.

3. A computer implemented method as recited in claim 2, wherein the presenter device can change to be another device including one of the plurality of viewer devices.

4. A computer implemented method coupling a presenter device, a presentation sharing server, and a viewer device for efficient web browser-based remote screen sharing of image data to be selectively captured from a presenter's computer screen and selectively transmitted for display to one or more viewers over a communications network, the method comprising:

supporting both synchronous and asynchronous viewing of presentation images converted from presentation slides, wherein both the synchronous and asynchronous session of presentation viewing is supported through a webpage using Javascript on a web browser, wherein the webpage enables a screen sharing session between the presenter and the viewer through a placeholder presentation item among the presentation images;

loading a presentation webpage in a first web browser at a presenter device, the presentation webpage including presentation control code;

executing the presentation control code via the first web browser including:
  determining a display area for capturing a screen image of the presenter device;
  capturing the screen image of the presenter device;
  determining whether to send a full refresh image or a differential update image to the viewer device as the current presentation data, wherein the full refresh image is sent upon receiving a request from a viewer device for the full refresh image, or when more than a predetermined percentage of the display area has changed since sending the last current presentation data to the presentation sharing server;
  transmitting the current presentation data to the presentation sharing server;

storing the current presentation data at the presentation sharing server;

sending, to a viewer device, a presentation viewing webpage, the presentation viewing webpage comprising an embedded viewing script wholly implemented within the presentation viewing webpage, the embedded viewing script configured to send an image refresh request to the presentation sharing server, to receive an image requested, and to display the image requested;

loading the presentation viewing webpage in a second web browser at the viewer device;

transmitting the current presentation data from the presentation sharing server to the viewer device;

receiving, from the viewer device, an image refresh request at the presentation sharing server, and transmitting the image refresh request to the presenter device, the image refresh request comprising an image sequence identifier derived by the viewer device;

executing the viewing script at the second web browser includes:
  receiving presentation image data;
  displaying at least a portion of the presentation image data at the viewer device; and
  constructing a path from the presenter's last cursor position to the presenter's current cursor position to animate cursor movement by rendering on the viewer device the image of the presenter's cursor along the reconstructed path.

5. A computer implemented method as recited in claim 4, wherein the screen sharing server determines which images to transmit to the viewer device by comparing stored images to an image associated with an image sequence identifier received from the viewing device together with a request for images.

6. A computer implemented method as recited in claim 4, wherein the screen sharing server evaluates a presentation token received from the viewer device to determine whether the viewer device is authorized to participate in a specific presentation.

7. A computer implemented method as recited in claim 4, wherein the screen sharing server stores presentation images for record keeping purposes.

8. A computer implemented method as recited in claim 4, wherein the presentation control code determining the appropriate presentation image includes receiving current presentation pointer position and constructing a reasonable point path from the current pointer position to a previous presentation pointer position.

9. A computer implemented method as recited in claim 8, further including the presentation control code determining the appropriate presentation image by layering over existing images.

10. A system for providing presentations to a viewer without requiring viewer downloads of software for efficient web browser-based remote screen sharing of image data to be selectively captured from a presenter's computer screen and selectively transmitted for display to one or more viewers over a communications network, the system comprising:

a presentation system supporting both synchronous and asynchronous viewing of presentation images converted from presentation slides, wherein both the synchronous and asynchronous session of presentation viewing is supported through a webpage using Javascript on a web browser, wherein the webpage enables a screen sharing session between the presenter and the viewer through a placeholder presentation item among the presentation images;

a presenter device running a first web browser with a first web page having a presentation control applet for capturing a display area of a screen at the presenter device and transmitting to a presentation sharing server presentation image data of the display area comprising either:
full refresh data of the display area generated or a differential update of the display area;
the presentation sharing server sending, to a viewer device, a presentation viewing webpage, the presentation viewing webpage comprising an embedded viewing script wholly implemented within the presentation viewing webpage, the embedded viewing script configured to send an image refresh request to the presentation sharing server, to receive an image requested, and to display the image requested;
the presentation sharing server receiving, from the viewer device, an image refresh request at the presentation sharing server, the image refresh request comprising an image sequence identifier derived by the viewer device, wherein the image refresh request is sent upon execution of the viewing script at a web browser running on the viewer device;
in response to the image refresh request received from the viewer device, the presentation sharing server determining requested presentation image data based on the sequence identifier received from the viewer device; and
transmitting the requested presentation image data from the presentation sharing server to the viewer device, responsive to the image refresh request.

11. A system as recited in claim 10, wherein the presentation control applet is operable to identify an active window via unique markings.

12. A system as recited in claim 10, wherein the presentation control applet determines whether image information transmitted to the presentation sharing server is a full refresh image or a differential image refresh, and wherein the full refresh image is used a) when the presentation is sending a first image, b) a display area has changed, c) a request for a full refresh has been received at the presentation device, d) a difference between a previous captured image and a current captured image exceeds a predefined level, and e) a maximum number of differential image updates have been transmitted since the last full refresh image.

13. A system as recited in claim 10, wherein the viewer script is operable to generate as part of displayed presentation images a reasonable presentation pointer path having only previous and current presenter pointer position information.

14. A computer implemented method as recited in claim 4, wherein the presentation webpage provides the presenter a button which opens a new browser window including a pre-determined set of webpages to facilitate the presentation.

15. A computer implemented method as recited in claim 4, wherein the presentation webpage provides the presenter a button which opens a new browser window within which the presenter can enter the URL to browse to any webpage.

16. A computer implemented method as recited in claim 4, wherein the presentation webpage provides a link to download and display a document.

17. A computer implemented method as recited in claim 4, wherein the presentation webpage prompts the presenter to open a specific desktop application.

18. A computer implemented method for efficient web browser-based remote screen sharing of image data to be selectively captured from a presenter's computer screen and selectively transmitted for display to one or more viewers over a communications network, comprising:
supporting both synchronous and asynchronous viewing of presentation images converted from presentation slides, wherein both the synchronous and asynchronous session of presentation viewing is supported through a webpage using Javascript on a web browser, wherein the webpage enables a screen sharing session between the presenter and the viewer through a placeholder presentation item among the presentation images;
loading a viewing webpage in a first web browser at a viewer device, the viewing webpage comprising an embedded viewing script wholly implemented within the viewing webpage, the embedded viewing script configured to send an image refresh request, comprising an image sequence identifier derived by the viewer device, to the presentation sharing server, to receive an image requested, and to display the image requested;
executing the viewing script via the first web browser, including:
receiving presentation data from a server;
displaying the presentation data at the viewer device, and
constructing a path from the presenter's last cursor position to the presenter's current cursor position to animate cursor movement by rendering on the viewer device the image of the presenter's cursor along the reconstructed path;
wherein the server receives the presentation data for transmitting to the viewer device from a presenter device, and
further wherein the presenter device loads a presentation webpage in a second web browser, the presentation webpage including presentation control code, wherein upon execution of the presentation code, the presenter device enables the presentation control code to gain access to a screen of the second web browser, and
further wherein execution of the presentation control code via the second web browser includes:
determining a display area for capturing a screen image of the presenter device;
capturing the screen image of the presenter device;
determining whether to send a full refresh image or a differential update image to the viewer device as the current presentation data, wherein the full refresh image is sent upon receiving a request from a viewer device for the full refresh image, or when more than a predetermined percentage of the display area has changed since sending the last current presentation data to the presentation sharing server;
transmitting the current presentation data to the presentation server for sending to the viewer device.

19. The computer implemented method as recited in claim 18, wherein the viewer device is one of a plurality of viewer devices accessing the presentation data via the server.

20. A computer implemented method as recited in claim 1, further comprising storing some of the full refresh data received from the presenter device in persistent memory.

* * * * *